United States Patent Office 2,930,961
Patented Mar. 29, 1960

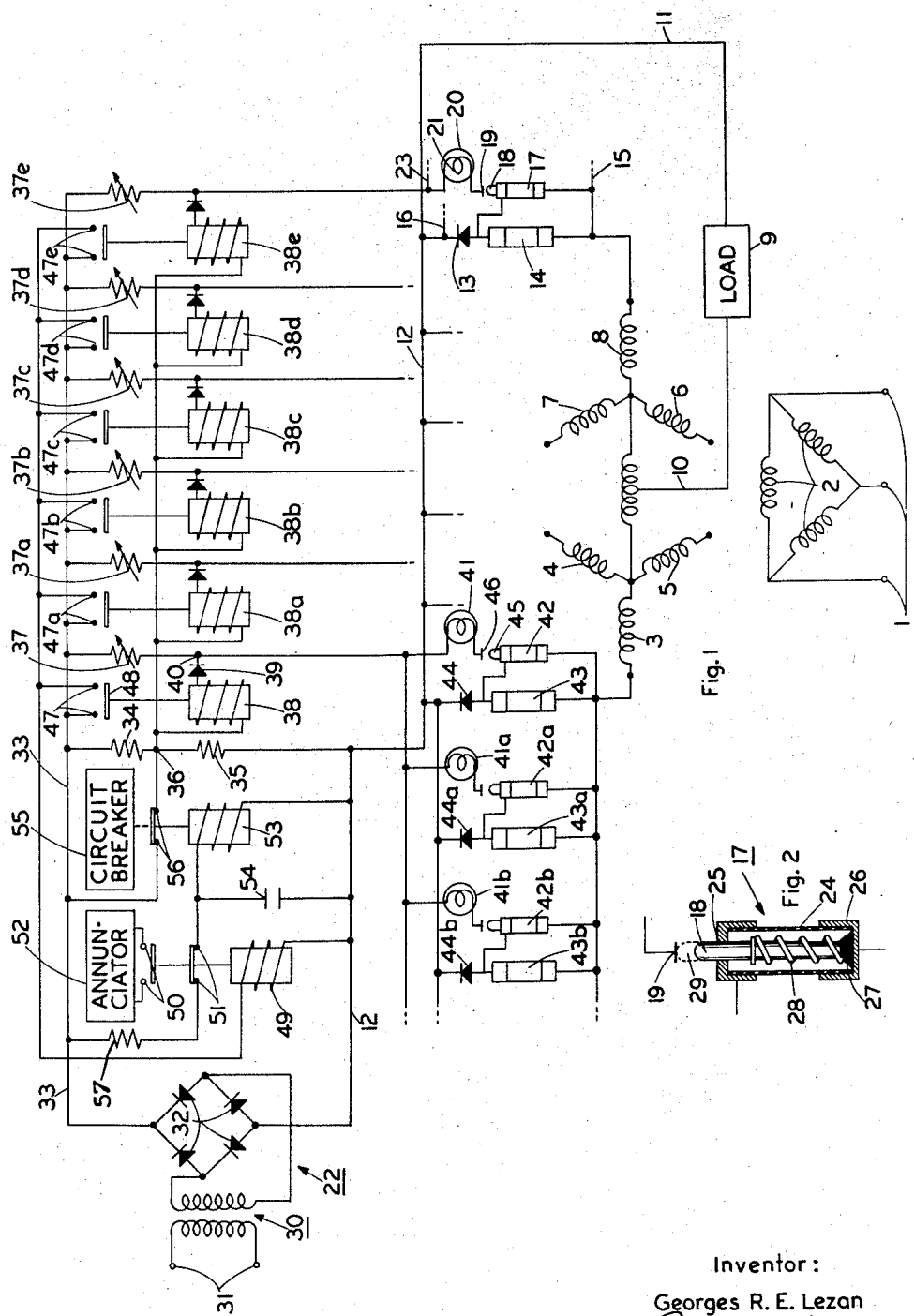

2,930,961
FUSE MONITORING CIRCUIT

Georges R. E. Lezan, Lynchburg, Va., assignor to General Electric Company, a corporation of New York Application December 20, 1957, Serial No. 704,141

9 Claims. (Cl. 321—14)

The present invention relates to electrical protective apparatus and, more particularly, to improved arrangements of fusing and signaling devices which yield accurate warning and afford automatic protection against equipment failures.

In one practice of teachings of this invention, semiconductor power rectifier circuitry is automatically protected against damage and likelihood of failure. Such circuitry may tend to possess unusual susceptibility to power interruptions due to burned fuses, for example, since it is known in such circuitry to operate as many as three dozen fused semiconductor cells in parallel to obtain desired output current ratings exceeding those of single cells. Semiconductor cells currently in use are relatively costly components and the electrical ratings thereof cannot be exceeded without danger of permanent damage, hence it is common to protect each cell, or pair of cells, with a power fuse rated to minimize the possibility of cell destruction.

When any one of a plurality of such paralleled semiconductor cells has its associated series power fuse opened, thereby signifying either that the fuse or both the fuse and cell require replacement, it may be highly undesirable for the industrial user of the embodying equipment to incapacitate his equipment immediately for cell or fuse substitutions, and often the remaining paralleled cells are relied upon to provide the additional current carrying capacity until such replacements can be made more conveniently. When more than a given number of paralleled rectifiers have been open-circuited by their fuses, the current capacities of the remaining cells will tend to become exceeded and all the cells will be in danger of destruction or open circuiting by their fuses, and at this point it would be preferable to disable the entire system automatically.

Optimum utilization and maintenance of such rectifier circuitry may be realized if the locus of each power fuse failure is readily identifiable, and if the operator is warned of the existence of any cell failures in a manner enabling convenient replacements. Further, automatic interruption or disabling of the rectifier system upon occurrence of current overloads may be distinctly advantageous.

Accordingly, it is one of the objects of the present invention to provide improved apparatus for the protection of fused electrical equipment which produces timely warning of and protection against failures.

It is a further object to provide monitoring electrical circuitry for fused power rectifiers which warns of individual fuse failures and which responds to a given total number of failures to disable the equipment.

It is a still further object to provide an indicating and automatic disabling fusing system wherein the current characteristics of incandescent signal lamps afford distinctive electrical outputs useful for both automatic warning and disabling.

By way of a summary account of this invention in one of its aspects, I couple an alternating current source with a direct current load through a plurality of paralleled semiconductor power rectifiers each including a separate protective power fuse in series therewith. In parallel with each power fuse, there is disposed a lower-rated auxiliary fuse having a contact movable to close an external circuit under influence of a spring when a fusible element melts. Each of the external circuits closable by the auxiliary fuses includes a separate incandescent signaling lamp in one leg of a bridge having three other resistance legs. The excitation for the bridge is applied from a D.-C. source and a sensitive relay coil having a blocking diode in series therewith is coupled across certain points in the bridge. Upon occurrence of a power fuse failure, its associated auxiliary fuse closes an external circuit through one of the incandescent signal lamps, and an initial inrush of lamp current causes the relay coil to become energized and actuate a warning annunciator. This relay actuation results from momentary voltage differences of one polarity between the bridge points due to the inrush of lamp current, although the bridge voltage difference thereafter quickly assumes a reversed polarity, and the relay coil becomes deenergized and ceases actuation, upon the occurrence of a lower steady-state lamp current. When a given small number of such fuses have failed, however, the combined steady-state lamp currents become sufficient to create a permanent voltage difference between bridge points which is of a polarity to maintain the relay coil continuously energized through the diode. The associated relay contacts couple excitation to a time-delay relay which operates to disable the main power system.

The foregoing and other objects and advantages may be better understood, and further details concerning preferred practices may best be perceived through reference to the following description taken in connection with the accompanying drawing, wherein:

Figure 1 is a schematic representation of a semiconductor power rectifier system having an associated fuse monitoring circuit embodying this invention; and Figure 2 presents a partly-sectioned view of one form of auxiliary fuse which may be advantageously employed in practice of these teachings.

The equipment portrayed in Figure 1 involves 3-phase excitation circuitry, such as is commonly employed in industrial applications, the electrical interconnections being of the double wye type. In the main power circuit, the 3-phase A.-C. excitation leads 1 energize delta-connected transformer primary windings 2, and the secondary wye-connected windings 3, 4, 5, 6, 7, and 8 deliver outputs to a load 9 from each of the six output phases. In the interest of clarity and simplicity, only two of the phases are illustrated in interconnection with power rectifiers and the load, these phases involving the transformer secondary windings 3 and 8. D.-C. load 9 receives electrical excitation from busses 10 and 11 which are coupled with the centers of the wye-connected secondary and with a rectifier output buss 12, respectively. With appropriate power rectifiers interposed between buss 12 and each of the transformer secondary windings 3 through 8, the load will receive the intended direct current.

Considering for a moment the one transformer secondary winding 8, it is found that this winding is connected with load 9 through a series combination of a semiconductor power rectifier 13 and its protective main fuse 14, the fuse 14 being rated to preclude damage to the cell. As a practical matter, single semi-conductor rectifier cells may be incapable of rectifying currents of the magnitudes which should pass through each phase of a polyphase system useful in high-power industrial applications. Thus, while the one phase including winding 8 is illustrated with but a single cell 13 therein, it will be understood that in practice there would be further series combinations of cells and fuses paralleled therewith, and as many as 36 such power cells have been paralleled in this manner to satisfy current requirements. Leads 15 and 16 across the series combination of cell 13 and fuse 14 are dashed to indicate that further units are intended to be coupled in parallel.

Failure of a protective main fuse, such as fuse 14, will result in increased current through the remaining cells in the parallel combination for this phase, and when the current formerly carried by the rectifier in the blown fuse circuit is shared among a large number of parallel cells, the increased current in the latter may not result in violation of their ratings. However, it is obviously desirable that the fact of a fuse having blown be indicated, and that its locus be identified also, whereby replacements can be made at convenient times to maintain the equipment in optimum operating condition. Provision for warning or signaling of this nature is preferably made through use of auxiliary fuses, such as fuse 17, in parallel with the main protective fuses. In the case of auxiliary fuse 17, for example, this unit will normally experience only relatively low voltages across it, these voltages being the drops across main fuse 14, and the auxiliary fuse will remain intact and unactuated. Should the main fuse 14 blow, the electrical signals impressed upon the auxiliary fuse 17 are then substantial enough to cause a fusible member therein to melt, and a spring-biased plunger and contact 18 thereof engages a signaling circuit contact 19. In series circuit relationship with contacts 18 and 19, there appears a signaling lamp 20 having an incandescent filament 21 therein, and this combination is energized by direct current output of a monitoring circuit source 22. Illumination of lamp 20 thus characterizes the failure of the main power fuse 14, and the operator is thus apprised of the fact that both fuses 14 and 17, and possibly the associated semiconductor cell 13, must be replaced. The dashed-line lead 23 denotes that similar lamps and auxiliary fuses are coupled in like manner with the other rectifier and main fuse units paralleled in this phase.

One auxiliary fuse, such as fuse 17, is depicted in Figure 2 in a cross-section view which aids in understanding the general character and operation of fuses adaptable to purposes of this invention. The fuse structure is that of a cartridge formed by an insulating tube 24 and conducting end contacts 25 and 26. A central conducting plunger 18 connects contacts 25 and 26 through a fusible element 27. Upon occurrence of excessive currents through the fuse, the fusible element 27 melts and the contacting plunger 18, which had theretofore been held in the illustrated position against the force of compressed spring 28, is urged to the dashed-line position 29 by spring 28 and completes an electrical path between end contact 25 and the contact bar 19 in a warning or alarm circuit. The current ratings of the auxiliary fuses are sufficiently low, compared with the power fuse current breakings, to result in positive and immediate signaling operation upon openings of main fuses.

The circuitry which monitors the condition of cells and power fuses in the phases of the main power system is separately excited by direct current from the aforementioned source 22. This source includes a transformer 30, the primary of which is energized by A.-C. supply terminals 31, and further includes a bridge of four rectifiers 32 which apply direct current potentials across line 33 and line 12, the latter being electrically common to the monitoring circuit and the main power system. Excitation from source 22 causes illumination of signaling lamps, in a manner earlier described, and it further occasions actuation of a plurality of relays, some of which relays initiate operation of warning apparatus or circuit breakers. One particularly significant feature of the monitoring circuit is found in voltage-dividing or bridge arrangements which respond uniquely to circuit interruptions in each of the main rectifier phases. One portion of such a bridge includes the two resistances 34 and 35 which are of approximately the same value, in one arrangement, which are serially coupled across the output leads 12 and 33, and which preserve a predetermined voltage at their juncture 36. Considering the main circuit output phase which includes the secondary transformer winding 3, it is found that there is associated with this particular phase the monitoring circuit elements including a bridge resistance 37 and the series combination of a relay coil 38 and blocking diode 39. The latter series combination is coupled at one end with the aforesaid voltage divider point 36, and at the opposite end with a voltage point 40. This arrangement will be recognized as a form of bridge which lacks a further resistance leg and it is found that this resistance leg may be comprised of one or more of the signal lamps 41, 41a, 41b, etc., in the main power phase under consideration. Normally, of course, none of these signal lamps is in circuit with the remainder of the bridge, but they are introduced into the bridge circuitry when their associated auxiliary fuses 42, 42a, 42b, etc., are actuated. The circuit arrangements of signal lamp 41, trigger fuse 42, main power fuse 43, and main semiconductor rectifier cell 44, and the similar paralleled circuits identified by the same numerals with distinguishing letters a, b, etc., added, are like those earlier described with reference to semiconductor cell 13 and its main fuse 14.

Assuming a rupture of main fuse 43, for example, the associated auxiliary fuse 42 will respond instantly by releasing its contact plunger 45 such that it will engage the stationary contact 46 and complete a warning signal path through lamp 41. This path may be traced from the bus 12 through power cell 44, contacts 45 and 46, lamp 41, and to the other source lead 33 through resistance 37. Although the main power rectifier cell 44 is shown to be included in this path, and such a cell may be subject to failure, experience demonstrates that semiconductor cells invariably fail in a short-circuited rather than open-circuited condition and the warning system thus would not be interrupted. It is important in connection with operation of the warning circuitry to understand that incandescent lamps, which possess a positive temperature coefficient of resistance, may have a hot resistance many times that of their cold resistance, as, for example, in the ratio of 4 or 5 to 1. This characteristic of signaling lamp 41 results in an initial current surge, due to actuation of trigger fuse 42, which is of a peak magnitude 4 or 5 times that of its later steady-state current. In one lamp, the current surge decays to 200 percent of the lamp steady-state current value in approximately 30 milliseconds. When the aforesaid path is completed, and the initial current surge through lamp 41 takes place, the voltage drop across bridge resistance 37 momentarily occasions a higher voltage at bridge point 40 than exists at bridge point 36, whereupon the blocking diode 39 permits conduction of a pulse of current through the warning relay coil 38. Relay contacts 47 are thus momentarily closed by the relay armature 48, and annunciating operation described later herein is caused to take place.

As the filament of signaling lamp 41 reaches its steady-state high operating temperature, with an attendant reduction of lamp current to a low steady-state value, the voltage drop through resistance 37 is simultaneously reduced. Therefore, the voltage at bridge point 40 drops, and because of a pre-established relationship between resistance 37 and signal lamp current, the voltage at point 40 is caused to be less than the voltage at bridge point 36. Under this condition, the blocking diode 39 prevents further excitation of relay coil 38, and causes its relay contacts 47 to become opened. The signal lamp 41 continues to provide illumination, however, and identifies the locus of the fault once it has occurred.

If it now be further assumed that fuse 43a ruptures, its signal lamp 41a will illuminate, and the steady-state value of voltage at bridge point 40 will be increased. When a predetermined number of such main fuses have blown, the combined steady-state signal lamp currents will cause the voltage at point 40 to exceed that of bridge point 36 under steady-state conditions, and blocking diode 39 will permit a flow of current which maintains relay coil 38 in a continuously energized state and further maintains the relay contacts 47 continuously closed. The bridge circuitry may be adjusted to maintain this continuously-actuated condition upon the failure of any given number of fuses or cells, by simple adjustment of one of the bridge resistances, such as the resistance 37 which has been illustrated in a variable resistance form. The warning bridge circuitry for each of the other phases of the main power supply include corresponding elements which, in the drawings, are identified by the same reference characters with distinguishing small letters, a, b, c, etc., added. It will be perceived that while each of these additional circuits includes a separate bridge resistance 37a—37e, the aforementioned bridge resistances 34 and 35 are common to the illustrated 6-bridge arrangements, and an advantageous economy of components is thus realized.

Electrical closure of any one of the sets of relay contacts 47 through 47e by their associated relay coils 38 through 38e, respectively, serves to couple electrical energy between supply lead 33 and bus 12 through the relay coil 49. If the contact closures are of a momentary character only, in the manner described hereinabove, relay coil 49 will close its associated normally-open contacts 50 momentarily and will open its normally-closed contacts 51 momentarily. Annunciator 52 responds to momentary closures of contacts 50 by displaying an alarm signal, and this device is preferably of the type which locks itself in a condition indicating that a fault has occurred in this system. Normally-closed contacts 51 are in a series circuit relationship with a resistance 57 and a disabling relay coil 53 across the monitor source leads 12 and 33. A capacitance 54 is paralleled with relay coil 53 and this capacitor and the inherent resistance of relay coil 53 function as a time-delay arrangement preventing actuation of the armature of relay coil 53 until the contacts 51 have been opened for a predetermined length of time. The drop-out time delay for relay coil 53 is set by values of the relay coil resistance and capacitance 54 to be greater than the momentary openings of contacts 51 which will result from surge currents in signal lamps. Therefore, unless a number of signal lamps greater than a predetermined limited number is energized responsive to fuse failures in a single phase of the rectifier system, the relay coil 53 will not actuate the associated circuit breaker 55 or open the associated normally-closed relay contacts 56.

If one of the contact sets 47 through 47e is held continuously closed by occurrence of a number of faults in one phase exceeding the predetermined number, the relay coil 49 maintains its relay contacts 51 in an open state for a sufficient length of time for the capacitor 54 to discharge through relay coil 53 and permit the main circuit breaker 55 to trip. Circuit breaker 55 is illustrated in block form for purposes of preserving simplicity in the drawings, although it will be understood that this device except when held closed by the armature of relay coil 53 would serve to open the main system excitation leads, such as A.-C. leads 1.

Once the circuit breaker 55 has been actuated and power has been removed from the rectifier equipment, the signaling lights which had heretofore been energized will continue to signal fuse failures until the appropriate power and auxiliary fuses are replaced. If the monitoring circuit transformer 30 is de-energized and then energized once more while the main circuit power fuses, auxiliary fuses, and defective cells have not been replaced, the monitoring circuit will provide an alarm and disable the rectifier circuit. In this manner, it is insured that the operator will be made clearly aware of the need for these replacements at the convenient time when the rectifier equipment is just about to be put into operation. This characteristic is realized by means of the normally-closed contacts 56 of relay coil 53, the contacts 56 being paralleled with bridge resistance 34. The time delay provided by resistance 57 and capacitance 54 is of particular advantage at this time. Upon initial application of output voltage to leads 12 and 33 by the monitoring circuit source 22, the normally-closed relay contacts 56 will preserve voltage point 36 at the level of lead 33 for a brief time interval, and if any one of the relay contacts 47 through 47e is closed by signal lamp current, the relay coil 49 will be energized and the relay contacts 51 opened to insure that the circuit breaker 55 keeps the main rectifier equipment unenergized. If even a single signal lamp, such as lamp 41, draws current, thereby indicating that its associated auxiliary fuse 42 and main fuse 43 have not been replaced, this current will generate a voltage drop across its associated bridge resistance 37 which provides a higher voltage at bridge point 40 than appears at bridge point 36 under influence of the relay contacts 56 shorting the bridge resistance 34. Thus, a single signal lamp will cause an associated blocking rectifier, such as rectifier 39, to cause a relay coil, such as coil 38 to conduct current and maintain the associated relay contacts 47 in a closed state. In turn, the closed contacts 47 will preserve contacts 51 in an open condition, and prevent the excitation of relay coil 53 which would be needed to close the main circuit breaker 55. However, when all of the fuses and defective cells are replaced, none of the signal lamps is illuminated, and the relay contacts 47 through 47e remain open, and the normally-closed relay contacts 51 permit the relay coil 53 to be brought into an energized condition after a slight safeguarding time delay occasioned by resistance 57 and capacitance 54. After this time delay, relay contacts 56 are opened and the main circuit breaker 55 closed, thereby putting the rectifier equipment into operation with its monitoring circuit in a poised condition to respond to faults.

Although the present invention has been described in connection with a particular illustrated embodiment thereof, those skilled in the art will recognize that various modifications, substitutions, and changes may be introduced without departure either in spirit or scope from this invention in its broader aspects.

What I claim as new and desire to secure by Letters Patent of the United States is:

1. In a power supply including a plurality of semiconductor power rectifier cells connected in parallel each with a separate power fuse in series therewith, a plurality of auxiliary fuses each paralleled with one of said power fuses to rupture therewith and thereby to close separate contacts, a plurality of incandescent signaling lamps each in series with different ones of said contacts, an electrical source, an electrical bridge energized by said source and having in one leg thereof the paralleled series combinations of said lamps and contacts, said bridge developing high momentary output signals responsive to high initial surge currents of said lamps upon closure of any of said contacts, relay means actuated responsive to output signals from said bridge which are above a predetermined value and less than said high momentary signals, and signaling and power supply disabling means responsive to actuations of said relay means.

2. In a power supply including a plurality of semiconductor power rectifier cells connected in parallel each with a separate power fuse in series therewith, a plurality of auxiliary fuses each having a fusible element paralleled with a different one of said power fuses and each having a first contact member and a second contact member biased to move toward said first contact member against restraint of said fusible element, a plurality of incandescent lamps each in series with said contact members of a different one of said auxiliary fuses, an electrical bridge having said lamps and contact members coupled in one leg thereof, an electrical source energizing said bridge, said bridge developing high momentary output signals upon closure of said contact members of any of said auxiliary fuses, electrical relay means connected across said bridge to respond to output signals which are above a predetermined value and less than said high momentary signals, and signaling and power supply disabling means responsive to actuations of said relay means.

3. In a power supply including a plurality of semiconductor rectifier cells connected in parallel each with a separate power fuse in series therewith, a plurality of auxiliary fuses each paralleled with one of said power fuses to rupture therewith and thereby to close separate contacts, a plurality of incandescent signaling lamps each in series with different ones of said contacts, an electrical source, an electrical bridge energized by said source and having in one leg thereof the paralleled series combinations of said lamps and contacts, said bridge developing high momentary output signals responsive to high initial surge currents of said lamps upon closure of any of said contacts, relay means actuated responsive to output signals from said bridge which are above a predetermined value and less than said high momentary signals, means signaling fuse failure responsive to actuations of said relay means, circuit breaker means for disabling said power supply, and time delay means operating said circuit breaker means responsive to actuations of said relay means persisting beyond a predetermined minimum time.

4. In a power supply including a plurality of semiconductor rectifier cells connected in parallel each with a separate power fuse in series therewith, a plurality of normally-open sets of contacts each operated to close upon rupture of a different one of said power fuses, a plurality of resistance devices each having a positive temperature coefficient of resistance and each coupled in series with a different one of said contact sets, an electrical source, an electrical bridge energized by said source and having in one branch thereof the paralleled series combinations of said resistance devices and contacts, said bridge developing high output signals responsive to initial current surges through said devices upon closures of said contacts, relay means actuated responsive to output signals from said bridge which are above a predetermined value and less than said high output signals, and signaling and power supply disabling means responsive to momentary and prolonged actuations of said relay means, respectively.

5. In a power supply including a plurality of semiconductor power rectifier cells connected in parallel each with a separate power fuse in series therewith, a plurality of auxiliary fuses each paralleled with one of said power fuses to rupture therewith and thereby to close separate contacts, a plurality of incandescent lamps each in series with different ones of said contacts, an electrical source, voltage divider means energized by said source and producing a first voltage, an impedance, means serially coupling said impedance and the paralleled series combinations of said lamps and contacts across said source to develop second voltages when said contacts are closed, relay means coupled with said voltage divider means and said impedance for actuation when said second voltages exceed said first voltage, and signaling and power supply disabling means reponsive to momentary and prolonged actuations of said relay means, respectively.

6. In a power supply including a plurality of semiconductor power rectifier cells connected in parallel each with a separate power fuse in series therewith, a plurality of auxiliary fuses each paralleled with a different one of said power fuses to rupture therewith and thereby to close separate contacts, a plurality of incandescent lamps each in series with different ones of said contacts, an electrical source, voltage divider means energized by said source and producing a first voltage, an impedance, means serially coupling said impedance and the paralleled series combinations of said lamps and contacts across said source to develop second voltages when said contacts are closed, said second voltages being high momentarily when said contacts close and initially high currents surge through any of said lamps, a blocking diode, relay means coupled with said voltage divider means and said impedance through said diode for actuation only when said second voltages exceed said first voltage, signaling means responsive to actuations of said relay means, circuit breaker means for disabling said power supply, time delay means, and means actuating said circuit breaker means through said time delay means responsive to prolonged actuations of said relay means.

7. In a power supply including a plurality of semiconductor power rectifier cells connected in parallel each with a separate power fuse in series therewith, a plurality of auxiliary fuses each paralleled with a different one of said power fuses to rupture therewith and thereby to close separate contacts, a plurality of incandescent lamps each in series with different ones of said contacts, an electrical unidirectional current source, voltage divider means energized by said source and producing a first voltage, an impedance, means serially coupling said impedance and the paralleled series combinations of said lamps and contacts across said source to develop second voltages when said contacts are closed, said second voltages being high momentarily when said contacts close and initially high currents surge through any of said lamps, a blocking diode, first relay means coupled with said voltage divider means and said impedance through said diode for actuation only when said second voltages exceed said first voltage, second relay means having normally closed contacts opened responsive to actuations of said first relay means, third relay means coupled for excitation by said source through said second relay means contacts, time delay means delaying operations of said third relay means, normally closed contacts actuated by said third relay means and coupled when closed to shunt at least a part of said voltage divider means and to minimize said first voltage, circuit breaker means for disabling said power supply, and means coupling said circuit breaker for actuation by said third relay means.

8. In a power supply including a plurality of semiconductor rectifier cells connected in parallel in each of a plurality of output phases thereof and each having a separate power fuse in series therewith, a plurality of auxiliary fuses each paralleled with one of said power fuses to rupture therewith and thereby to close separate contacts, a plurality of incandescent signaling lamps each in series with different ones of said contacts, an electrical source, voltage divider means energized by said source and producing a first voltage, a plurality of impedances, means coupling each of said impedances in series with the paralleled series combinations of said lamps and contacts in a different one of said output phases, means coupling the series combinations of said impedances and said paralleled lamps and contacts across said source to develop other voltages when said contacts are closed, said other voltages being high momentarily when said contacts close and initially high currents surge through any of said lamps upon occurrence of fuse failure, a plurality of blocking diodes, a plurality of relays each coupled with said voltage divider means and with a different one of said impedances through a different one of said diodes for actuation only when said other voltages exceed said first voltage, signaling means responsive to actuations of said relays, circuit breaker means for disabling said power supply, time delay means, and means actuating said circuit breaker means through said time delay means responsive to prolonged actuations of any of said relays.

9. In a power supply including a plurality of semiconductor rectifier cells connected in parallel in each of a plurality of output phases thereof and each having a separate power fuse in series therewith, a plurality of auxiliary fuses each having a fusible element paralleled with a different one of said power fuses and each having a first contact member and a second contact member biased to move toward said first contact member against restraint of said fusible element, a plurality of incandescent signaling lamps each in series with said contact members of a different one of said auxiliary fuses, a unidirectional current source, voltage divider means energized by said source and producing a first voltage, a plurality of resistances, means coupling each of said resistances in series with the paralleled series combinations of said lamps and contact members in a different one of said output phases, means coupling the series combinations of said resistances and said paralleled lamps and contacts across said source to develop other voltages when said contact members are closed, said other voltages being high momentarily when said contact members close and initially high currents surge through any of said lamps upon occurrence of fuse failure, a plurality of blocking diodes, a plurality of first relays each coupled with said voltage divider means and with a different one of said diodes for actuation only when said other voltages exceed said first voltage, a second relay coil responsive to actuations of any of said first relays, normally closed contacts actuated by said second relay coil, a third relay coil coupled for excitation by said source through said second relay contacts, a time relay resistance in series with said third relay coil, a time delay capacitance in parallel with said third relay coil, normally closed contacts actuated by said third relay coil, said third relay contacts when closed being coupled to shunt at least part of said voltage divider and to minimize said first voltage, circuit breaker means for disabling said power supply, and means coupling said circuit breaker means for actuation by said third relay coil.

References Cited in the file of this patent
UNITED STATES PATENTS

| | | |
|---|---|---|
| 1,358,718 | Fortescue | Nov. 16, 1920 |
| 2,807,771 | Winograd | Sept. 24, 1957 |
| 2,813,243 | Christian et al. | Nov. 12, 1957 |